United States Patent
Lee et al.

(10) Patent No.: US 8,578,914 B2
(45) Date of Patent: Nov. 12, 2013

(54) FUEL TANK VALVE STRUCTURE CONTROLLING EMISSION GAS IN HYBRID VEHICLE

(75) Inventors: Chang-Hoon Lee, Busan-shi (KR); Sung-Won Lee, Hwasung-shi (KR)

(73) Assignees: Hyundai Motor Company, Seoul (KR); Kia Motors Corporation, Seoul (KR); Unick Corporation, Busan-shi (KR)

( * ) Notice: Subject to any disclaimer, the term of this patent is extended or adjusted under 35 U.S.C. 154(b) by 401 days.

(21) Appl. No.: 12/949,509

(22) Filed: Nov. 18, 2010

(65) Prior Publication Data

US 2012/0073548 A1 Mar. 29, 2012

(30) Foreign Application Priority Data

Sep. 29, 2010 (KR) .................. 10-2010-0094238

(51) Int. Cl.
*F02M 33/02* (2006.01)
(52) U.S. Cl.
USPC ........................ 123/519; 123/516; 123/518
(58) Field of Classification Search
USPC .......... 123/516, 518, 519; 137/601.14, 601.2, 137/601.21
See application file for complete search history.

(56) References Cited

U.S. PATENT DOCUMENTS

| | | | | |
|---|---|---|---|---|
| 5,460,137 A * | 10/1995 | Zabeck et al. | ................ | 123/520 |
| 6,253,802 B1 * | 7/2001 | Enge | ................. | 141/59 |
| 6,526,951 B2 * | 3/2003 | Ishigaki et al. | ................ | 123/519 |
| 6,651,953 B2 * | 11/2003 | Weldon | .................... | 251/129.02 |
| 6,843,271 B2 * | 1/2005 | Weldon et al. | ............. | 137/487.5 |
| 6,941,933 B2 * | 9/2005 | Veinotte et al. | ................ | 123/519 |
| 7,185,639 B1 * | 3/2007 | Roche et al. | ................... | 123/516 |
| 7,343,904 B2 * | 3/2008 | Jo | ................. | 123/519 |
| 7,448,367 B1 * | 11/2008 | Reddy et al. | ................... | 123/520 |
| 7,878,182 B2 * | 2/2011 | Yuen et al. | ..................... | 123/520 |
| 2002/0026960 A1 * | 3/2002 | Weldon | .................... | 137/601.14 |
| 2006/0185652 A1 * | 8/2006 | Tsuge et al. | .................. | 123/519 |
| 2007/0256670 A1 * | 11/2007 | Williams | ...................... | 123/519 |

FOREIGN PATENT DOCUMENTS

| | | |
|---|---|---|
| JP | 2008-45733 A | 2/2008 |
| KR | 1998-702018 A | 7/1998 |
| KR | 1999-0030333 U | 7/1999 |
| KR | 10-2007-0089859 | 9/2007 |

* cited by examiner

*Primary Examiner* — Stephen K Cronin
*Assistant Examiner* — Joseph Dallo
(74) *Attorney, Agent, or Firm* — Morgan, Lewis & Bockius LLP

(57) ABSTRACT

A fuel tank valve structure controlling emission gas in a hybrid vehicle may include a housing having one side connected with a fuel tank and the other side connected to a canister, a check valve mounted to the housing and opening or closing a first fluid passage connected between the canister and the fuel tank, a solenoid valve apparatus selectively connected with the check valve to open or close the first fluid passage to adjust an internal pressure of the fuel tank, a fuel limit vent valve apparatus mounted to the housing and selectively fluid-connecting to a space formed between the check valve and the fuel limit vent valve apparatus in the housing, and a relief valve mounted to the housing and selectively fluid-connecting the fuel tank with the canister through a second fluid passage.

7 Claims, 13 Drawing Sheets

FUEL TANK VALVE STRUCTURE CONTROLLING EMISSION GAS IN HYBRID VEHICLE

CROSS-REFERENCE TO RELATED APPLICATION

The present application claims priority to Korean Patent Application No. 10-2010-94238, filed on Sep. 29, 2010, the entire contents of which is incorporated herein for all purposes by this reference.

BACKGROUND OF THE INVENTION

1. Field of the Invention

The present invention relates to a fuel tank valve structure, and more particularly, to a fuel tank valve structure for hybrid vehicles which can control emission gas under various driving and stop conditions of plug-in hybrid vehicles.

2. Description of Related Art

Hybrid vehicles generally used in the relates art are driven by power from an internal combustion engine and power from electric motors, such that they are under interest due to fuel saving and environment-friendly features.

However, since both of the internal combustion engine and the electric motors for generating the power are equipped in the vehicle, the weight of the vehicle increases, and power for operating the electric motors is required, the internal resistance increases and the output is reduced. Further, energy is lost in the process of converting and storing electric energy.

Therefore, the plug-in hybrid vehicles that can be operated by charging the vehicle batteries at common houses to use an internal combustion engine and electric motors as independent power sources have been developed, in order to make the best use of electric vehicles while reducing energy loss during the process of converting the energy in the vehicles, and using the efficient internal combustion engine used in the related art.

Since the driving type changes while increasing the driving ratio of the electric motors in the plug-in hybrid vehicles, emission increases due to the decrease of the amount of engine fuzzy, such that measures against this problem are required.

That is, as shown in FIG. 1, a fuel limit vent valve apparatus for controlling emission gas and determining the amount of refill in refilling vehicles has functions of allowing for refilling by sending the air and emission gas in the fuel tank to the canister in refilling and controlling the amount of fuel injection by stopping sending the gas in the fuel tank to the canister when the fuel tank is fully filled with fuel, and has an additional function of preventing fuel from overflowing the canister or preventing the fuel from leaking out of the fuel tank.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a fuel tank valve structure for hybrid vehicles which can control emission gas when the engine is operating and simultaneously completely preventing the emission gas from flowing into the canister, when the amount of emission gas increases in the fuel tank with the engine stopped due to too much operation of the electric motors (non-fuzzy), for example, in plug-in hybrid vehicles.

In an aspect of the present invention, the fuel tank valve structure controlling emission gas in a hybrid vehicle, may include a housing having one side connected with a fuel tank and the other side connected to a canister, a check valve mounted to the housing and opening or closing a first fluid passage connected between the canister and the fuel tank, a solenoid valve apparatus selectively connected with the check valve to open or close the first fluid passage to adjust an internal pressure of the fuel tank, a fuel limit vent valve apparatus mounted to the housing and selectively fluid-connecting to a space formed between the check valve and the fuel limit vent valve apparatus in the housing, and a relief valve mounted to the housing and selectively fluid-connecting the fuel tank with the canister through a second fluid passage.

The check valve may include a check valve rubber slidably mounted in the housing and having an orifice at the center thereof to selectively close the first fluid passage and keep an emission gas in the fuel tank, a check valve body fixed to a side of the check valve rubber, and a check valve spring disposed in the housing and biasing the check valve rubber in a direction to provide elasticity.

The solenoid valve apparatus may include a solenoid valve case, a rod selectively connected to the orifice of the check valve rubber, a plunger protruding outward and connected with the other side of the rod to move with the rod, a core disposed apart from the plunger with a predetermined distance in the solenoid valve case to be selectively in close contact with the end of the plunger, and a coil wounding around the plunger and the core to actuate the plunger.

A solenoid valve O-ring may be disposed around an upper end of the solenoid valve case and a core O-ring may be disposed around a lower end of the core to prevent the emission gas from leaking, and a plunger stopper may be formed at the core to reduce noise and vibration generated by close contact with the plunger.

The relief valve may include a relief valve case connected to the housing to form the second fluid passage with the canister, a negative pressure valve disposed at one side of the relief valve case to open the first fluid passage to adjust inner pressure of the fuel tank when the inner pressure in the fuel tank may be lower than a pressure in the space, a relief valve body slidable in the relief valve case by the inner pressure to open the first fluid passage, a relief valve spring mounted in the relief valve case and biasing the relief valve body in one direction to selectively open the first fluid passage.

According to the exemplary embodiments of the present invention, it is possible to adjust capacity of fuel tanks used in the related art and load emission gas to a canister.

Further, it is possible to freely control loading emission gas to the canister even if the engine of a hybrid vehicle operates or not and it is possible to adjust loading the emission gas in injecting fuel, thereby increasing stability and convenience.

Further, it is possible to release with ease pressure due to normal pressure and negative pressure in the fuel tank.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
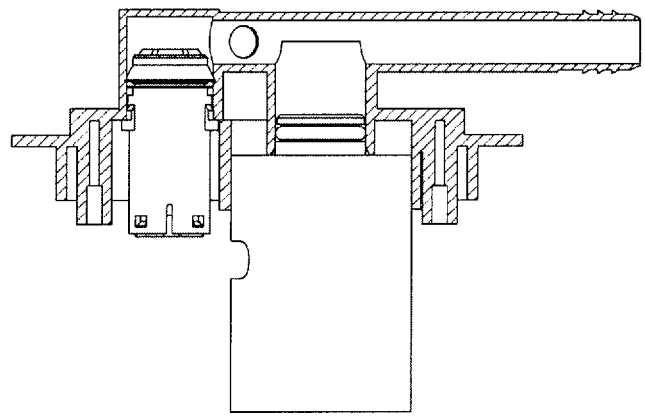
FIG. 1 is a cross-sectional view showing a fuel tank valve structure used in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 2:
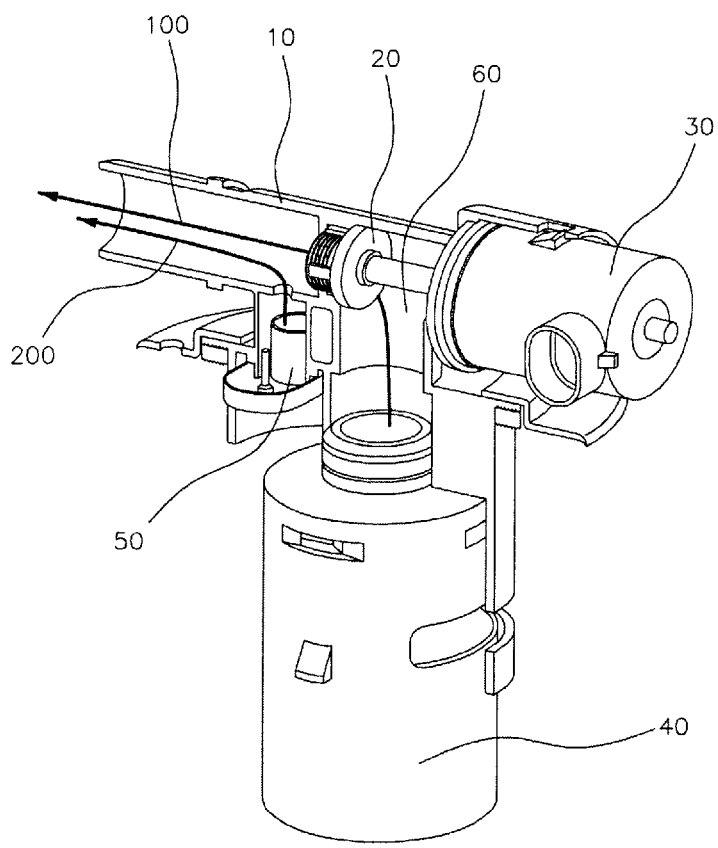
FIG. 2 is a cross-sectional perspective view showing structure of a fuel tank valve according to an exemplary embodiment of the present invention.

As shown in FIG. 2, a valve structure used in a fuel tank, according to an exemplary embodiment of the present invention, includes: a housing 10 having one side connected with the fuel tank and the other side connected to a canister, a check valve 20 opening/closing in the housing 10 connected with the canister, a solenoid valve 30 connected with the check valve 20 and opens/closes to adjust the internal pressure of the fuel tank, a fuel limit vent valve apparatus 40 connected to the end, which is connected to the fuel tank, of the housing 10, and a relief valve 50 connected to the lower end, which connected to the canister, of the housing 10.

That is, similar to the fuel tank valve structures used in the related art, the present invention sends and collects emission gas generated from the fuel tank to the canister, and particularly easily control the amount of increasing emission gas, when the engine is less operated by the operation of electric motors in plug-in hybrid vehicles.

Figure 4:
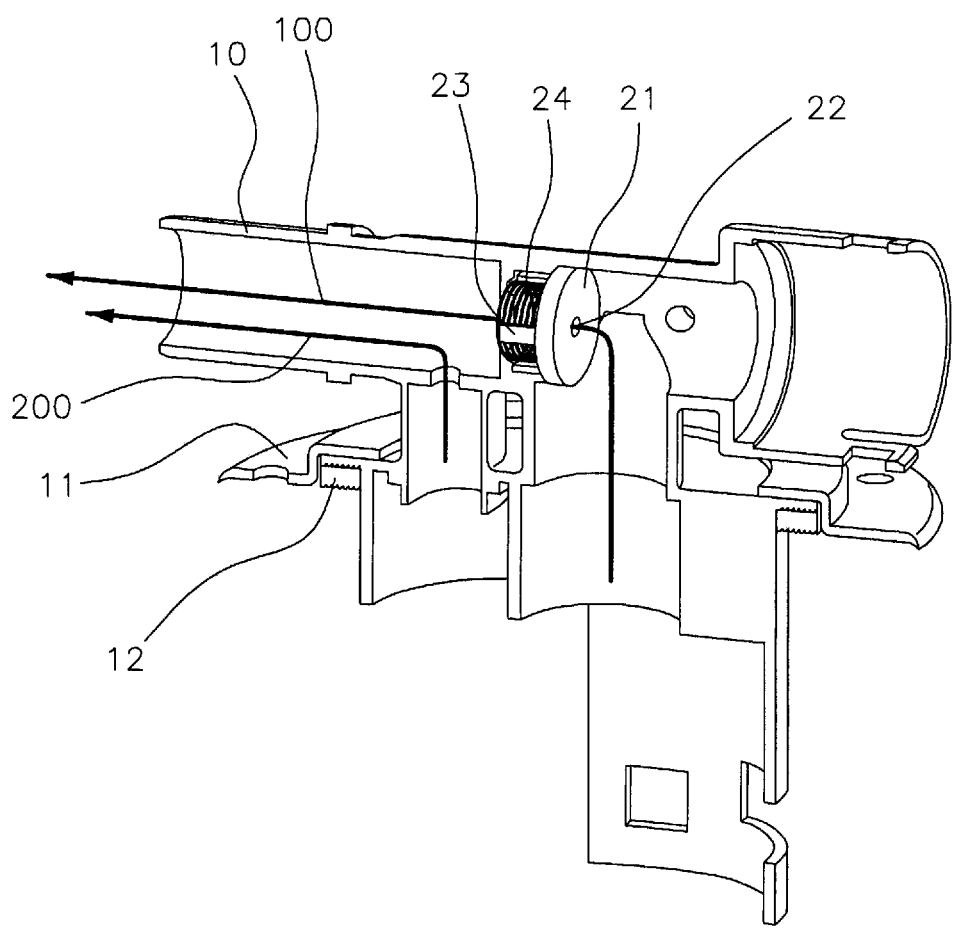
FIG. 4 is a cross-sectional view showing a housing and a check valve which are used in the present invention.

For this operation, as shown in FIG. 4, the housing 10 is connected to the top of the fuel tank 10, in which the housing 10 and the fuel tank are fixed by a cover and a packing 12 is provided to prevent the emission gas from leaking by sealing the space between the housing 10 and the fuel tank.

Figure 3A:
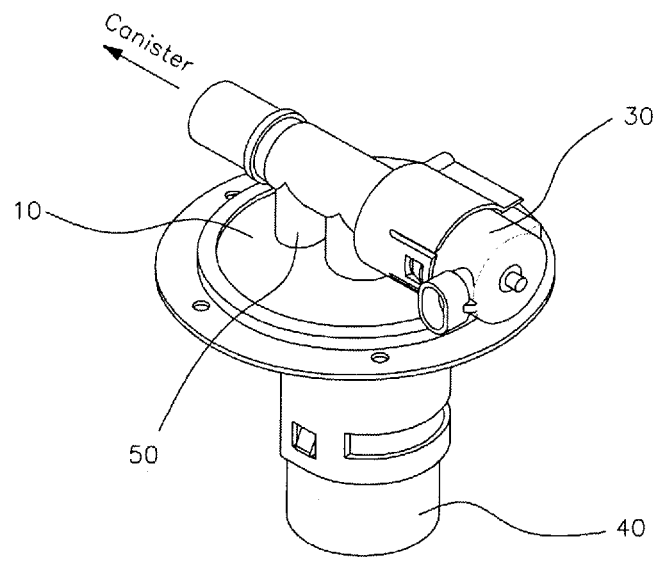
FIGS. 3A and 3B are external perspective view according to an exemplary embodiment of the present invention.
Figure 3B:
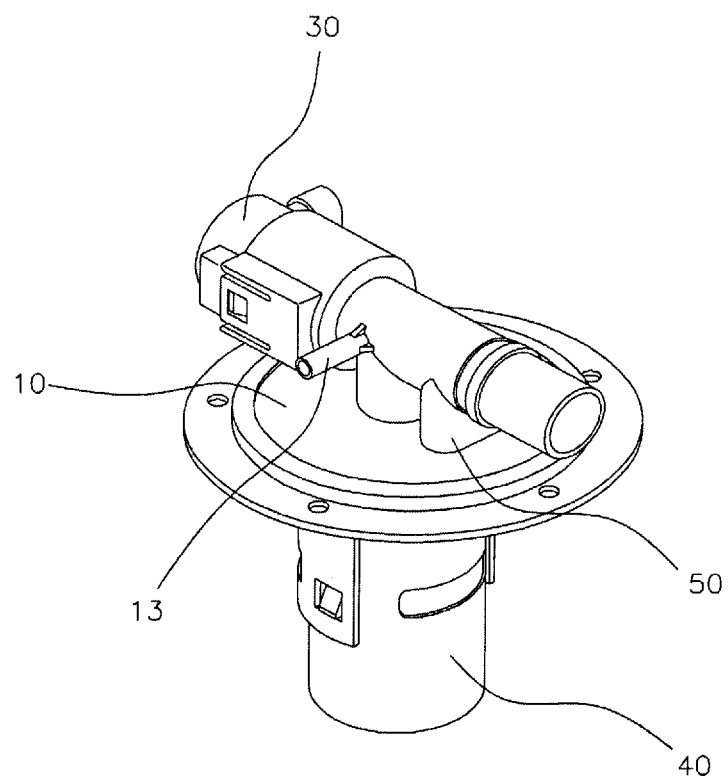

Further, as shown in FIGS. 3A and 3B, a separate GVV (ROV) nipple 13 is formed outside the housing 10, such that it is possible to prevent the fuel from overflowing the canister or from leaking out of the fuel tank.

The check valve 20 disposed in the joint of the housing 10 and the canister and includes a check valve rubber 21 with an orifice 22 at the center which keep the emission gas in the fuel tank, a check valve body 23 fixed in contact with one side of the check valve rubber 21, and a check valve spring 24 disposed inside the check valve body 23 to provide elasticity to the check valve rubber 21.

That is, as shown in FIG. 4, since the check valve 20 is disposed in the housing 10 to selectively discharge the emission gas through a first fluid passage 100 connecting the fuel tank and the canister, the emission gas flowing from the fuel tank to the canister through the housing 10 cannot easily leak to the canister by means of the check valve rubber 21, which has a circular plate shape, and it is possible to adjust pressure and the amount of discharged emission gas due to operation of the check valve body 23 and the check valve spring 24.

The check valve body 23 is connected to the check valve rubber 21 at one side and has a plurality of legs extending from the side to support the check valve 20 against the housing 10 and the spring in the check valve body 23 provides elasticity for the check valve body 23 to open the check valve 20 in accordance with pressure.

Further, the solenoid valve 30 is disposed at one side of the housing 10 and includes a solenoid valve case 31, a rod 32 connected in contact to one side of the check valve rubber 21 in a space 60, a plunger 33 protruding outward and connected with the other side of the rod 32 to move with the rod 32, a core 34 disposed apart from the plunger 33 and having a groove formed inward to be in close contact with the end of the plunger 33, and a coil 35 wounding around the plunger 33 and the core 34.

Figure 5:
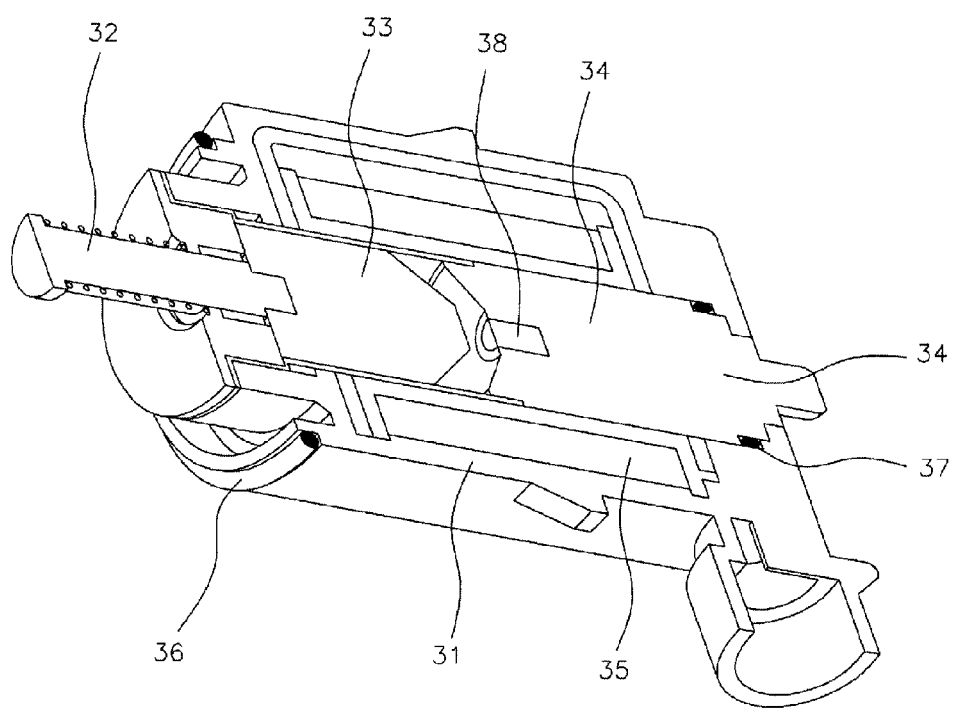
FIG. 5 is a cross-sectional view showing a solenoid valve used in the present invention.

That is, as shown in FIG. 5, the outer shape of the solenoid valve 30 is defined by a cylindrical solenoid valve case 31 such that the rod 32 is connected with the check valve 20, therefore, it is possible to adjust the internal pressure of the fuel tank and discharging the emission gas, together with the check valve 20.

Since the spring is disposed around the rod 32, it is possible to maintain elasticity for the rod 32 and easily adjust opening/closing.

The plunger 33 connected to the end of the rod 32 is generally formed in a cylindrical shape, where the other end not connected to the rod 32 protrudes outward.

The core 34 is formed at a predetermined space from a side of the plunger 33 and has the groove formed inward to be close contact with the end of the plunger 33, such that there is a provided a space for the plunger 33 to be able to move left and right.

Figure 8:
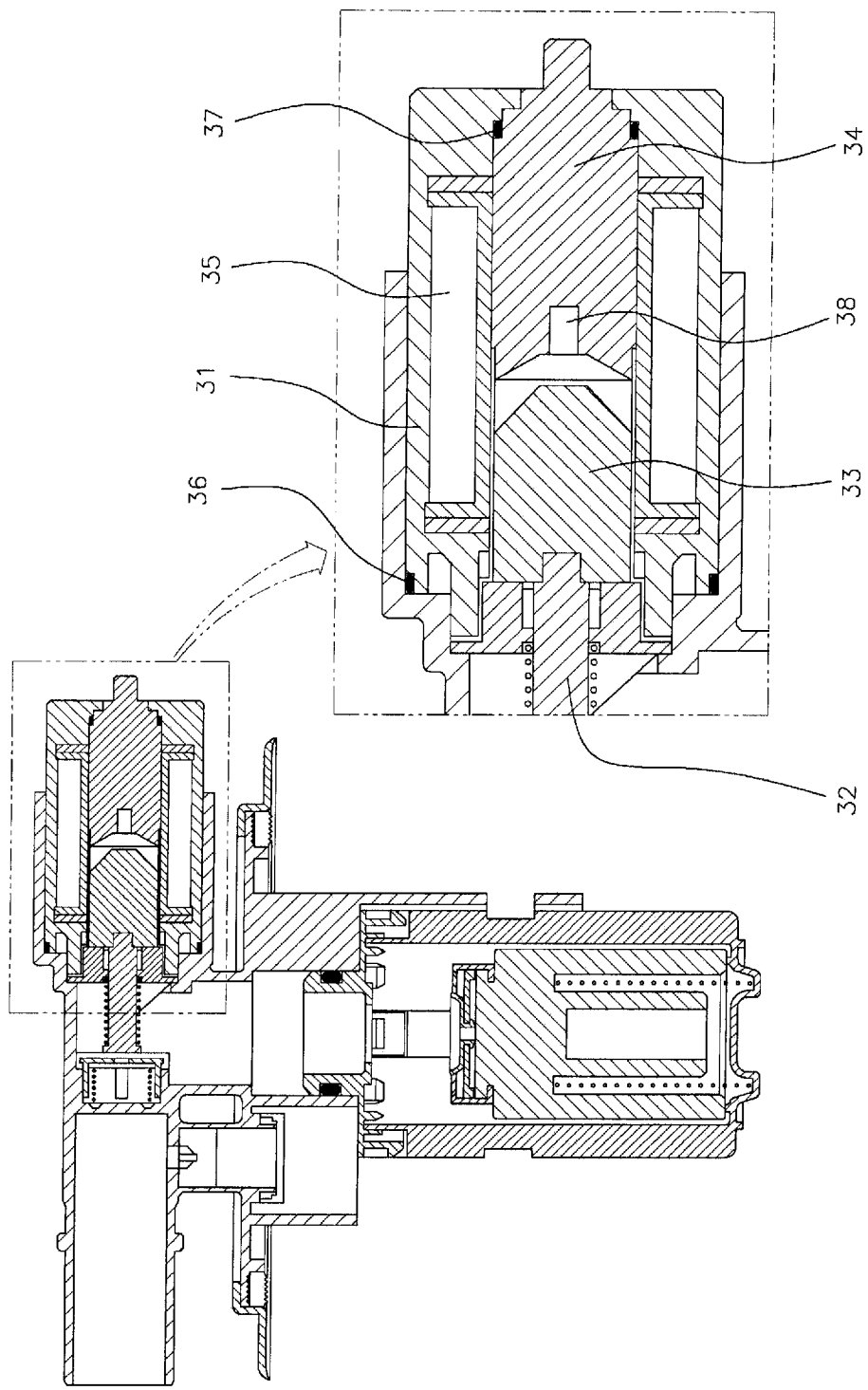
FIG. 8 is a cross-sectional view partially enlarging structure of the fuel tank valve according to an exemplary embodiment of the present invention.

Further, as shown in FIG. 8, a solenoid valve O-ring 36 is disposed around the upper end of the solenoid valve case 31 and a core O-ring 37 is disposed around the lower end of the core 34, such that the O-rings are close contact between the solenoid valve 30 and the housing 10 and the emission gas can be prevented from leaking to the outside.

Further, a plunger stopper 38 is formed at the center of the groove of the core 34, such that it is possible to reduce noise and vibration generated when the core 34 closely contact with the plunger 33 while moving left and right by means of operation of the plunger 33.

It is preferable to form the plunger stopper 38 at the center where the protruding end of the plunger 33 contacts the core 34, in accordance with the shapes of the protruding end of the plunger 33 and the groove in the core 34, and it is preferable that the plunger stopper is made of rubber to absorb shock.

Figure 6:
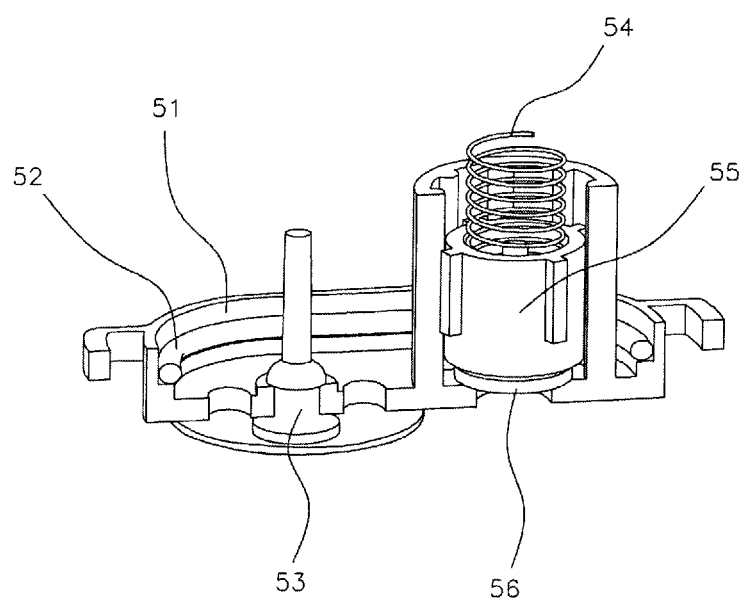
FIG. 6 is a cross-sectional view showing a relief valve used in the present invention.

FIG. 6 shows the relief valve 50 used in an exemplary embodiment of the present invention and the relief valve 50 includes a relief valve case 51 connected to the lower end of the housing 10, a relief valve O-ring 52 disposed in the relief valve case 51 to keep airtightness, a negative pressure valve 53 disposed at one side of the relief valve case 51 to adjust pressure by selectively opening the second fluid passage 200 connecting the fuel tank and the canister, a relief valve body 55 disposed in the relief valve case 51 and sliding up/down to adjust pressure by selectively opening the second fluid passage 200 connecting the fuel tank and the canister, a relief valve rubber 56 combined with the relief valve body 55, and a relief valve spring 54 connected to the inside of the relief valve body 55 and the housing 10 to provide elasticity.

The relief valve case 51 preferably has an elliptical cross-section to be connected to the lower end of the housing 10 and the relief valve O-ring 52 is preferably positioned along the inner side of the relief valve case 51 to keep airtightness between the relief valve 50 and the housing 10.

Further, the negative pressure valve 53 is formed at one side of the lower portion through the relief valve case 51 to contract or expand in accordance with the internal pressure of the fuel tank and the relief valve body 55 is formed to slide up/down inside the relief valve case 51 in accordance with the internal pressure of the fuel tank to selectively open the second fluid passage 200 connecting the fuel tank and the canister.

In similar shape to the negative pressure valve 53, the a relief valve rubber 56 is formed through the lower portion of the relief valve body 55 and a relief valve spring 54 is disposed in the relief valve body 55 and connected with the inside of the housing 10, such that it is possible to provide elasticity for the relief valve body 55.

Figure 7:
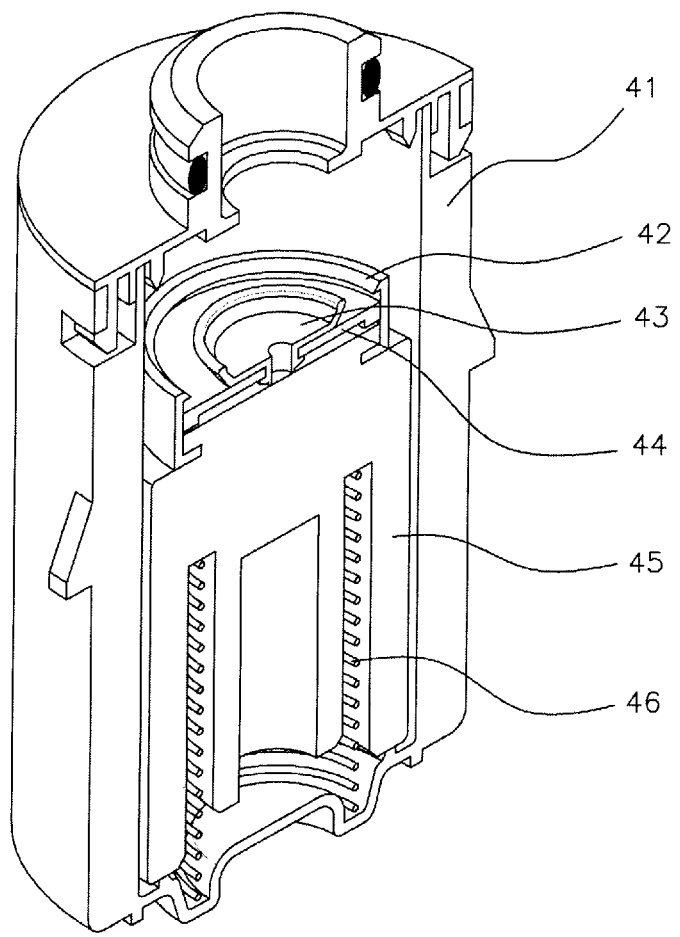
FIG. 7 is a cross-sectional view showing a fuel limit vent valve apparatus used in the present invention.

FIG. 7 shows the fuel limit vent valve apparatus 40 used in an exemplary embodiment of the present invention and the fuel limit vent valve apparatus 40 includes a cylindrical fuel limit vent valve apparatus case 41, a guider 42 sliding up/down in the fuel limit vent valve apparatus case 41, a rubber seal 43 and a seal plate 44 disposed in the guider 42 to adjust the flow of emission gas, and a float 45 connected to the lower end of the guider 42 to be moved up/down by the surface buoyancy of the fuel, and a fuel limit vent valve apparatus spring 46.

The fuel limit vent valve apparatus 40 sends and collects emission gas generated from the fuel tank in the canister, similar to the fuel limit vent valves used in the related art. The fuel limit vent valve apparatus 40 is open to send the emission gas to the canister in the normal state, but when the fuel tank is fully filled with fuel, it makes the float 45 move up to close the inside of the fuel limit vent valve apparatus 40, such that the internal pressure of the fuel tank temporality increases and fuel injected from the a refilling gun is stopped.

Figure 9A:
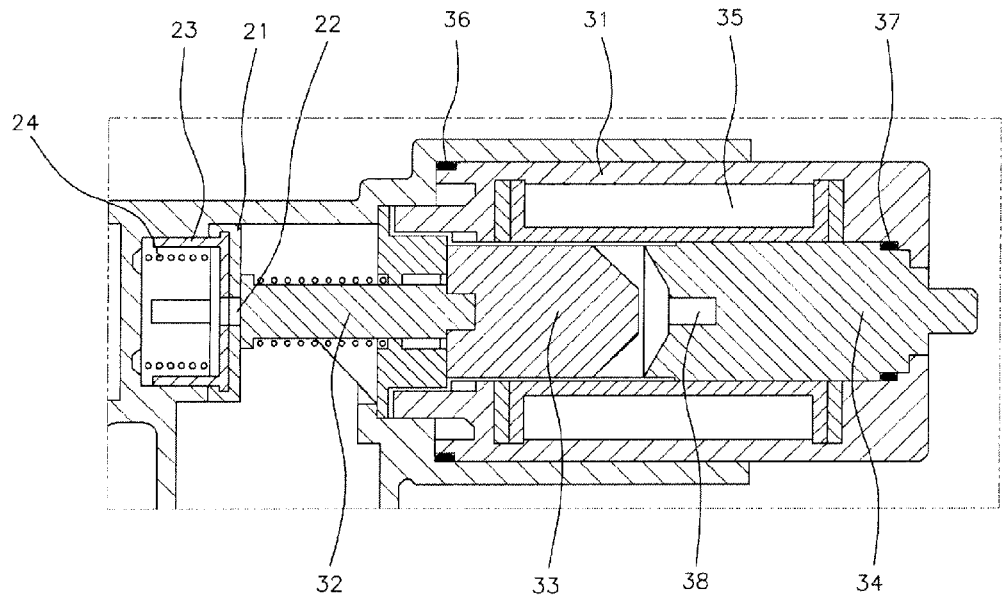
FIGS. 9A to 9C are flowcharts illustrating an operation process of the check valve and the solenoid valve of the present invention.
Figure 9B:
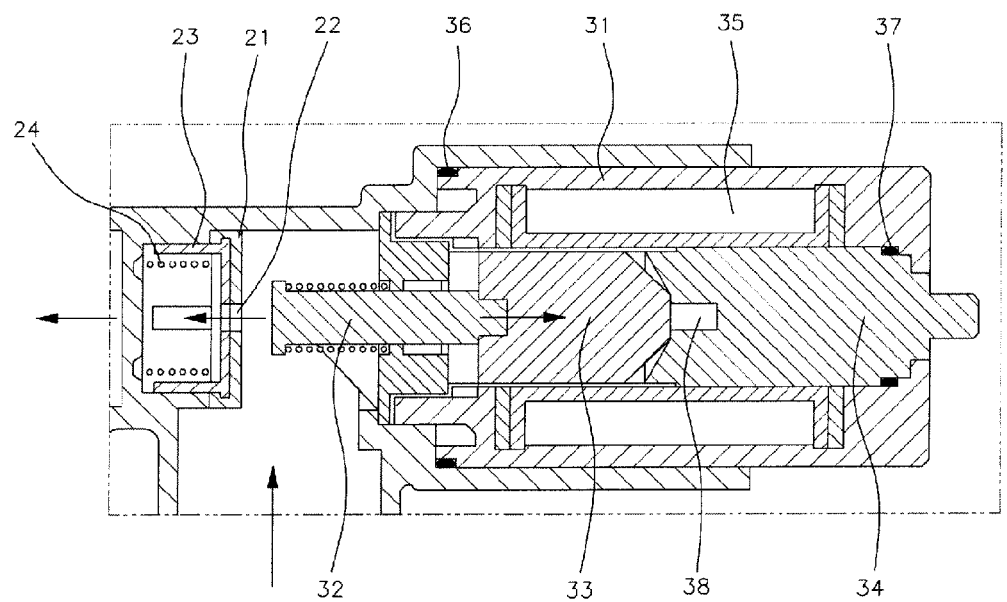
Figure 9C:
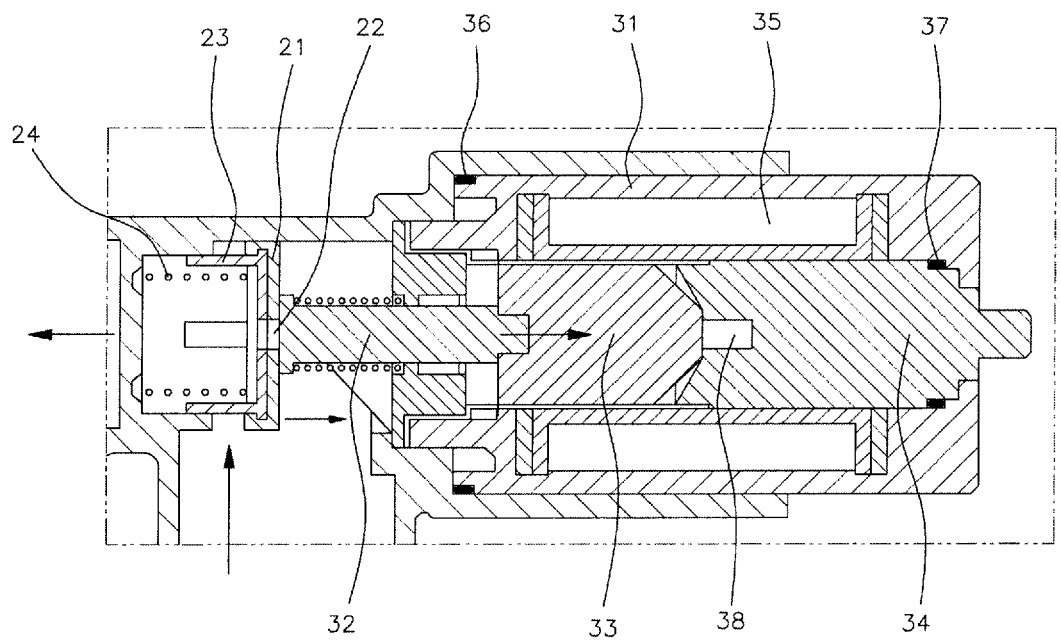

FIGS. 9A to 9C shows the operation process of the check valve 20 and the solenoid valve 30 which are used in an exemplary embodiment of the present invention.

First, as shown in FIG. 9A, when a plug-in hybrid vehicle is driven or stopped by only motors without operating the engine and fuel is not supplied, the solenoid valve 30 is not operated and accordingly the solenoid valve 30 and the check valve 20 are connected, thereby sealing the housing 10.

Therefore, the fuel tank valve structure of the present invention is completely closed, in which only an OPR function at pressure above a reference level of the inside of the fuel tank is performed.

Thereafter, as shown in FIG. 9B, a plug-in hybrid vehicle operates the engine or is refilled, the solenoid valve 30 is operated and accordingly, the plunger 33 in the solenoid valve 30 is moved in close contact with the core 34 and the rod 32 is correspondingly moved right.

Therefore, a gap is defined between the rod 32 and the check valve 20 and the emission gas can flow through the orifice 22 at the center of the check valve rubber 21, such that it is possible to adjust pressure between the fuel tank and the canister.

That is, it is possible to reduce first the internal pressure of the fuel tank by means of the primary operation, and when the pressure is suddenly released, it is possible to prevent malfunction of the ROVORVR valve in the fuel tank, thereby keeping safety of the entire vehicle.

Figure 10A:
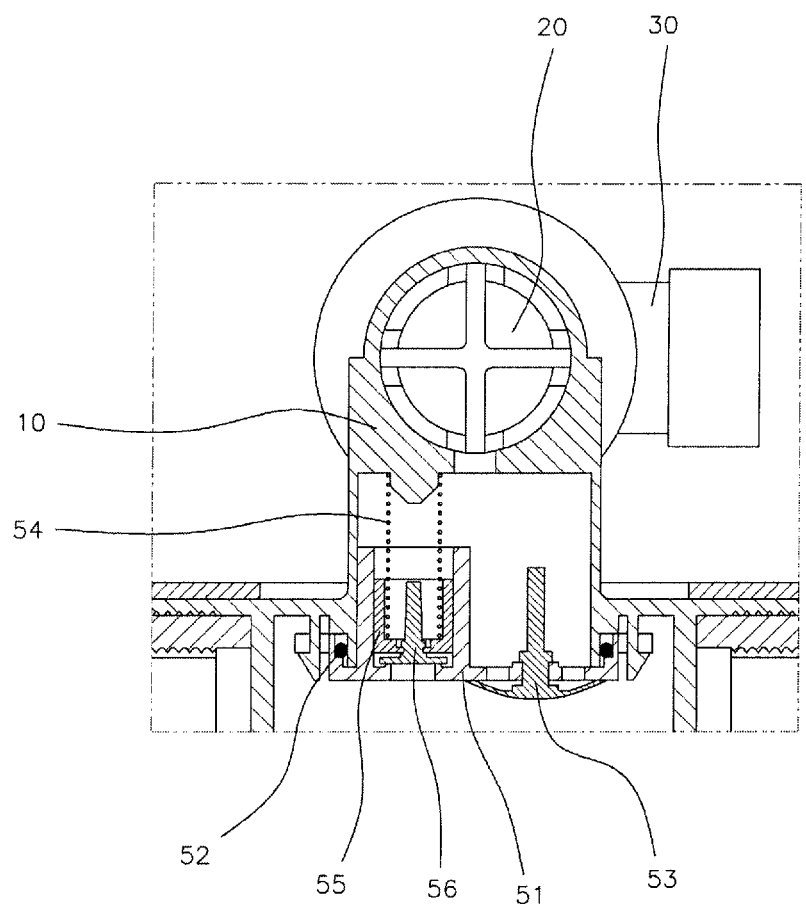
FIGS. 10A to 10C are flowcharts illustrating the operation of the relief valve of the present invention.
Figure 10B:
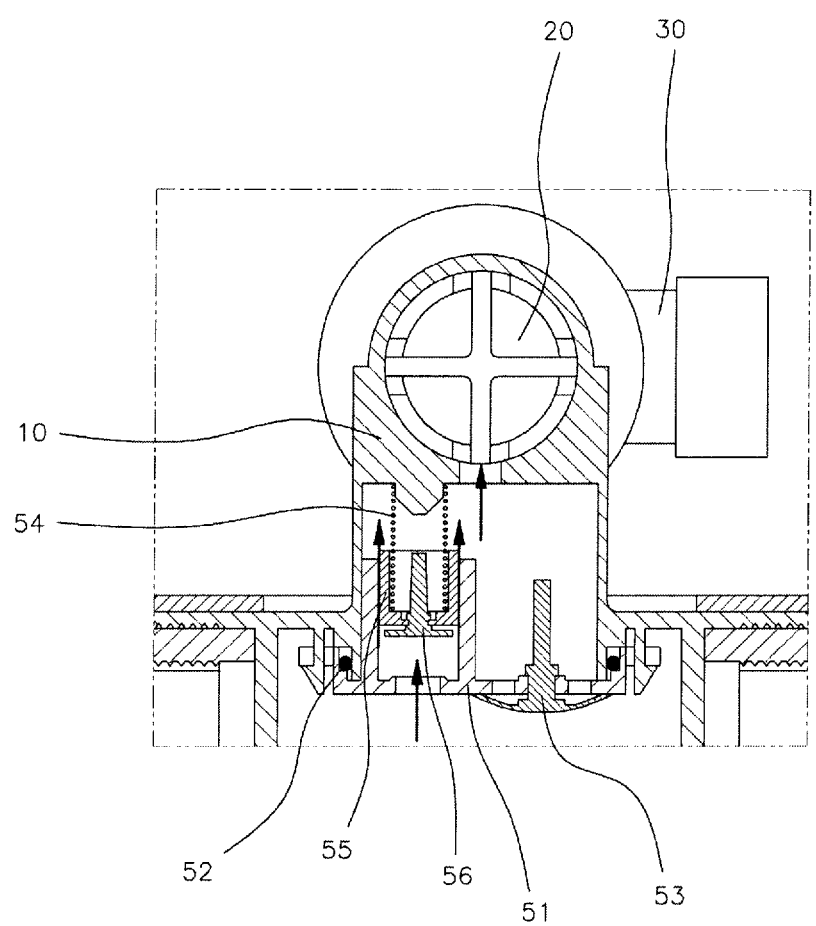
Figure 10C:
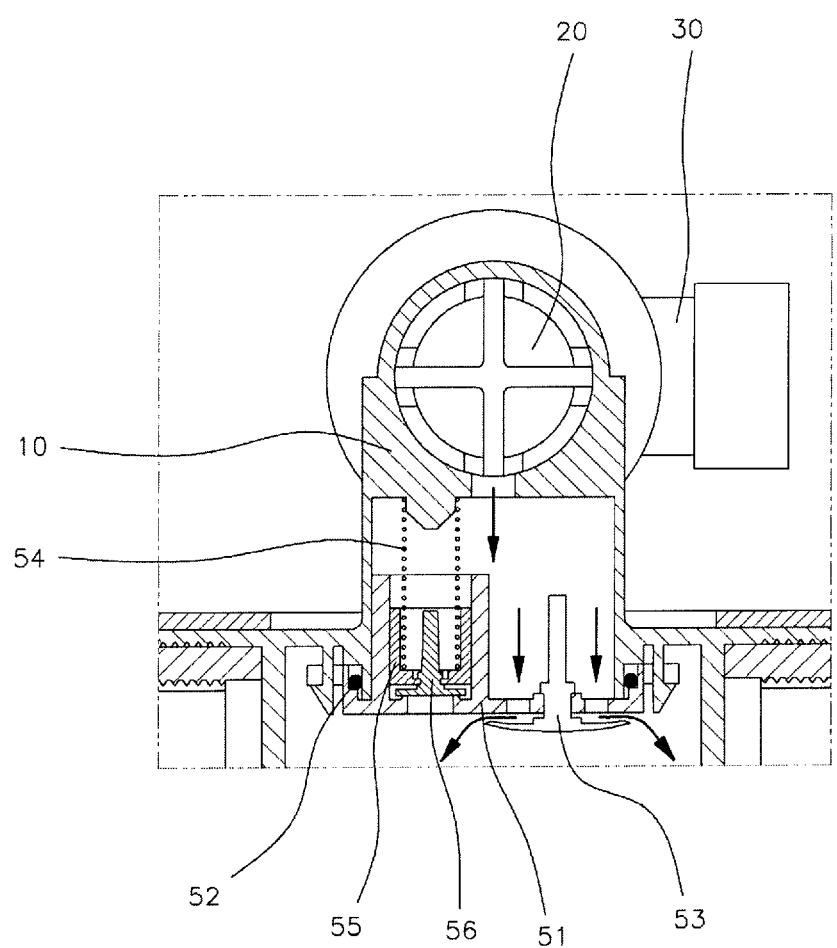

FIGS. 10A to 10C show the operation process of the relief valve 50 used in an exemplary embodiment of the present invention.

FIG. 10A shows the relief valve 50 under the internal pressure of the fuel tank of 0 to 33 kPa, the normal pressure. Under the normal pressure, the negative pressure valve 53 stably keeps equilibrium and pressure is equilibrated in the up-down direction between the relief valve body 55 and the relief valve spring 54, which are disposed at the lower portion in the relief valve case 51.

FIG. 10B shows when the internal pressure of the fuel tank is above 33 kpa, which is overpressure, where the relief valve body 55 and the relief valve rubber 56 moves to the upper portion in the relief valve case 51 and the relief valve spring 54 is compressed, such that emission gas flows from the inside of the fuel tank to the canister through the relief valve 50.

FIG. 10C shows when the internal pressure of the fuel tank is low, which negative pressure, where the emission gas flows from the canister to the fuel tank through the sides of the negative pressure valve 53, such that equilibrium of pressure can be adjusted.

Figure 11:
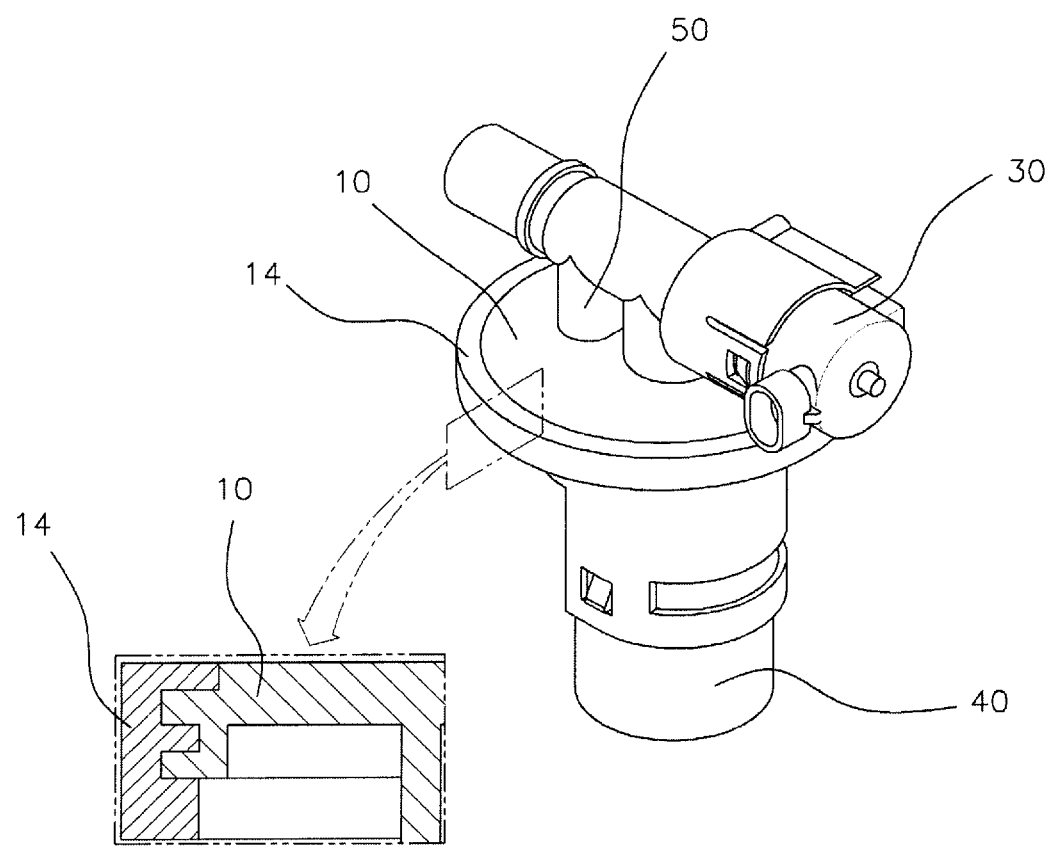
FIG. 11 is a perspective view showing another exemplary embodiment of the present invention.

The exemplary embodiment shown in FIGS. 3A and 3B shows a combination structure of the fuel tank, which is made of steel, and FIG. 11 shows a combination structure of a fuel tank, which is made of plastic, according to another exemplary embodiment.

That is, in the exemplary embodiment shown in FIGS. 3A and 3B, the housing 10 is combined with the fuel tank, which is made of steel, by the cover 11 and the cover 11 is fixed to the fuel tank by bolts.

However, in the exemplary embodiment shown in FIG. 11, the structure is preferably made by insert-injection by applying a low-pass structure to satisfy LEV3 and PZEV rules, and preferably, the housing 10 is made by injecting POM to combine the housing 10 with the fuel tank, which is made of plastic, and the connecting portion 14 is made by insert-injecting HDPE around the housing 10.

According to the exemplary embodiment of the present invention described above, it is possible to adjust the capacity of existing fuel tanks, load emission gas into the canister, prevent the emission gas from being loaded from the fuel tank to the canister when the engine stops, and load the emission gas from the fuel tank to the canister when the engine is in operate.

Further, it is possible to discharge emission gas from the fuel tank to the canister and it is also possible to release pressure at overpressure and negative pressure in the fuel tank, even if the engine does not operate in injecting fuel.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel tank valve structure controlling emission gas in a hybrid vehicle, the fuel tank structure comprising:
   a housing having one side connected with the fuel tank and the other side connected to a canister;
   a check valve opening/closing in the housing connected with the canister;
   a solenoid valve connected with the check valve to open/close the check valve to adjust an internal pressure of the fuel tank;
   a fuel limit vent valve apparatus connected to the end, which is connected to the fuel tank, of the housing; and
   a relief valve connected to the lower end, which connected to the canister, of the housing,
   wherein the check valve includes:
      a check valve rubber with an orifice at the center thereof which selectively keeps the emission gas in the fuel tank;
      a check valve body fixed in contact with one side of the check valve rubber; and
      a check valve spring disposed inside the check valve and the check valve rubber to provide elasticity, and
   wherein the solenoid valve includes:
      a solenoid valve case;
      a rod selectively coupled to the orifice of the check valve rubber;
      a plunger protruding outward and connected with the other side of the rod to move with the rod;
      a core disposed apart from the plunger and having a groove formed inward to be in close contact with the end of the plunger; and
      a coil wounding around the plunger and the core.

2. The fuel tank valve structure according to claim 1, wherein a solenoid valve O-ring is disposed around the upper end of the solenoid valve case and a core O-ring is disposed around the lower end of the core to prevent the emission gas from leaking, and a plunger stopper is formed at the center of the groove of the core to reduce noise and vibration generated by close contact with the plunger.

3. The fuel tank valve structure according to claim 1, wherein the relief valve includes:
   a relief valve case connected to a lower end of the housing;
   a relief valve O-ring disposed in the relief valve case to keep airtightness;
   a negative pressure valve disposed at one side of the relief valve case to adjust pressure;
   a relief valve body disposed in the relief valve case and sliding up/down;
   a relief valve rubber combined with the relief valve body; and
   a relief valve spring connected to the inside of the relief valve body and the housing to provide elasticity.

4. A fuel tank valve structure controlling emission gas in a hybrid vehicle, the fuel tank structure comprising:
   a housing having one side connected with a fuel tank and the other side connected to a canister;
   a check valve mounted to the housing and opening or closing a first fluid passage connected between the canister and the fuel tank;
   a solenoid valve apparatus selectively connected with the check valve to open or close the first fluid passage to adjust an internal pressure of the fuel tank;
   a fuel limit vent valve apparatus mounted to the housing and selectively fluid-connecting to a space formed between the check valve and the fuel limit vent valve apparatus in the housing; and
   a relief valve mounted to the housing and selectively fluid-connecting the fuel tank with the canister through a second fluid passage,
   wherein the check valve includes:
      a check valve rubber slidably mounted in the housing and having an orifice at the center thereof to selectively close the first fluid passage and keep an emission gas in the fuel tank;
      a check valve body fixed to a side of the check valve rubber; and
      a check valve spring disposed in the housing and biasing the check valve rubber in a direction to provide elasticity, and
   wherein the solenoid valve apparatus includes:
      a solenoid valve case;
      a rod selectively coupled to the orifice of the check valve rubber;
      a plunger protruding outward and connected with the other side of the rod to move with the rod;
      a core disposed apart from the plunger with a predetermined distance in the solenoid valve case to be selectively in close contact with the end of the plunger; and
      a coil wounding around the plunger and the core to actuate the plunger.

5. The fuel tank valve structure according to claim 4, wherein a solenoid valve O-ring is disposed around an upper end of the solenoid valve case and a core O-ring is disposed around a lower end of the core to prevent the emission gas from leaking, and a plunger stopper is formed at the core to reduce noise and vibration generated by close contact with the plunger.

6. The fuel tank valve structure according to claim 4, wherein the relief valve includes:
   a relief valve case connected to the housing to form the second fluid passage with the canister;
   a negative pressure valve disposed at one side of the relief valve case to open the first fluid passage to adjust inner pressure of the fuel tank when the inner pressure in the fuel tank is lower than a pressure in the space;
   a relief valve body slidable in the relief valve case by the inner pressure to open the first fluid passage;
   a relief valve spring mounted in the relief valve case and biasing the relief valve body in one direction to selectively open the first fluid passage.

7. The fuel tank valve structure according to claim 6, further comprising:
- a relief valve rubber combined with the relief valve body; and
- a relief valve O-ring disposed in the relief valve case to keep airtightness.

* * * * *